(12) United States Patent
Sugiyama et al.

(10) Patent No.: US 7,012,691 B2
(45) Date of Patent: Mar. 14, 2006

(54) OPTICAL MOVING INFORMATION MEASURING APPARATUS AND CARRIER SYSTEM INCORPORATING THE SAME

(75) Inventors: Hisakazu Sugiyama, Nara (JP); Akifumi Yamaguchi, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 325 days.

(21) Appl. No.: 10/635,024

(22) Filed: Aug. 6, 2003

(65) Prior Publication Data

US 2004/0027577 A1 Feb. 12, 2004

(30) Foreign Application Priority Data

Aug. 6, 2002 (JP) ............................. 2002-228733
Aug. 29, 2002 (JP) ............................. 2002-251368

(51) Int. Cl.
*G01N 21/84* (2006.01)

(52) U.S. Cl. ..................................... 356/429; 356/430

(58) Field of Classification Search ........ 356/429–431, 356/237.1–237.2, 614, 622; 250/573, 574; 382/106–108, 111–112
See application file for complete search history.

(56) References Cited

U.S. PATENT DOCUMENTS 5,737,070 A * 4/1998 Kato ........................ 356/28.5
6,259,531 B1 * 7/2001 Takamiya et al. ........... 356/499
6,330,065 B1 * 12/2001 Hill ............................ 356/485

FOREIGN PATENT DOCUMENTS

JP 06-034647 A 2/1994
JP 08-292263 A 11/1996

* cited by examiner

*Primary Examiner*—Michael P. Stafira

(74) *Attorney, Agent, or Firm*—Birch, Stewart, Kolasch & Birch, LLP

(57) ABSTRACT

An optical moving information measuring apparatus comprising: light generating means for forming two light spots at a predetermined interval, on a surface of a moving object to be measured providing at least a light emitting source, a collimator lens for collimating light emitted from the light emitting source and an objective lens for irradiating the light passed through the collimator lens to the surface of the moving object; a beam splitter for rotating an optical axis of each of the two types of light reflected from the light spots and passed through the objective lens by a predetermined angle; a light receiving lens through which the two types of light from the beam splitter pass; a light receiving element for receiving the two types of light passed through the light receiving lens; and a processing part for calculating a time delay of one from the other of two types of output signals from the light receiving element obtained by movement of the moving object in order to obtain moving information of the moving object.

18 Claims, 17 Drawing Sheets

PRIOR ART

OPTICAL MOVING INFORMATION MEASURING APPARATUS AND CARRIER SYSTEM INCORPORATING THE SAME

This nonprovisional application claims priority under 35 U.S.C. § 119(a) on Patent Application No(s). 2002-228733 and 2002-251368 filed in JAPAN on Aug. 6, 2002 and Aug. 29, 2002, respectively which is(are) herein incorporated by reference.

BACKGROUND OF THE INVENTION

1. Field of the Invention

The present invention relates to an optical moving information measuring apparatus and a carrier system incorporating the apparatus. And more particularly, it relates to an optical moving information measuring apparatus which is used in a carrier system for carrying an object whose surface is not a mirror surface such as a recording paper in an image forming apparatus such as a printer or a copying machine, and optically obtains moving information such as moving speed or a moved distance of the object, that is, the moving object to be measured (referred to as the moving object hereinafter) without touching and a carrier system incorporating the above apparatus.

2. Description of the Prior Art

As shown in FIG. 19, a conventional optical moving information measuring apparatus comprising two distance measuring sensors 1 and 2 and one processing circuit part 3 is well known.

A principle of the distance measuring sensors 1 and 2 in the optical moving information measuring apparatus will be described with reference to FIG. 20. Each of the distance measuring sensors 1 and 2 comprises a light emitting part 4, a lens 5 for converging diffused light from the light emitting part 4, a light receiving part 7 for receiving reflected light from a surface of a moving object 6 and a lens 8 for converging the light toward the light receiving part 7.

Here, the light from the light emitting part 4 inputs to the surface of the moving object 6 in the substantially vertical direction and the reflected light from the input position passes through the lens 8 to converge to the light receiving part 7. In the light receiving part 7, PSD (a ratio of an output 1 and an output 2 is varied according to a position of the spot light converged on the light receiving surface) is used and the distance between the distance measuring sensor 1 (2) and the moving object 6 can be measured by using the fact that the output 1/output 2 is varied corresponding to the distance between the distance measuring sensor 1(2) and the moving object 6.

More specifically, as shown in FIG. 19, if the moving object 6 moves from left to right (in the direction shown by an outline arrow), an output is provided by the two distance measuring sensors 1 and 2 according to the concavo-convex condition of the surface of the moving object 6 (the distance between each of the distance measuring sensors 1 and 2 and the moving object 6 is varied by the concavo-convex amount). As shown in FIG. 21, according to the output signal waveform obtained at this time, the distance measuring sensor 2 of B is delayed (by time Δt) as compared with the distance measuring sensor 1 of A according to the moving speed of the moving object 6. The moving speed and the moved distance of the moving object 6 can be obtained by calculating this delay by the processing circuit part 3.

As another conventional technique, an optical moving information measuring apparatus of a laser Doppler system disclosed in Japanese Published unexamined patent application (Kôkai tokkyo kôhô) No. Hei 8(1996)-292263 or the like is well known.

According to this optical moving information measuring apparatus, laser beam output from a laser light source is divided into two by a beam splitter and the laser beam passed through the beam splitter is irradiated directly to a moving object and the laser beam reflected from the beam splitter is reflected by a mirror to be irradiated to the moving object. Then, the diffused light having different frequencies and reflected from the moving object moving at constant speed is detected by a light receiving sensor through a converging lens and a Doppler signal is taken out to be processed by predetermined signal processing, whereby the moving speed of the moving object is measured.

According to the former optical moving information measuring apparatus, since two pairs of the distance measuring sensors 1 and 2 each comprising the light emitting part 4, the light receiving part 7 and two lenses 5 and 8 are necessary, the number of parts is increased, a size is large and a manufacturing cost is high. In addition, if there is a concavo-convex configuration detected by the distance measuring sensors 1 and 2 as a difference of the distance on the surface of the moving object 6, it can be measured, but if the moving object has a relatively smooth surface (surface having fine concavo-convex configuration), the measurement is difficult.

According to the latter optical moving information measuring apparatus of the laser Doppler system, since the laser beam is divided into two, the number of parts is increased, the signal processing is complicated and the apparatus becomes large and expensive.

SUMMARY OF THE INVENTION

The present invention was made in view of the above fact and it is an object of the present invention to provide an optical moving information measuring apparatus in which the number of parts is reduced, a size is small and a manufacturing cost is low and which can detect moving information even if a moving object has a relatively smooth surface, and a carrier system incorporating the above apparatus.

According to one aspect of the present invention, there is provided the optical moving information measuring apparatus comprising: light generating means for forming two light spots at a predetermined interval, on a surface of a moving object to be measured, providing at least a light emitting source, a collimator lens for collimating light emitted from the light emitting source and an objective lens for irradiating the light passed through the collimator lens to the surface of the moving object; a beam splitter for rotating an optical axis of each of two types of light reflected from the light spots and passed through the objective lens by a predetermined angle; a light receiving lens through which the two types of light from the beam splitter pass; a light receiving element for receiving the two types of light passed through the light receiving lens; and a processing part for calculating a time delay of one from the other of two types of output signals from the light receiving element obtained by movement of the moving object in order to obtain moving information of the moving object.

According to the optical moving information measuring apparatus of the present invention, light generated from the light emitting source and collimated by the collimator lens is irradiated onto the surface of the moving object such that an optical axis of lens becomes substantially vertical to the surface of the moving moving object by the objective lens. In addition, two light spots arranged at a predetermined interval are formed on the surface of the moving object by the two types of light generating means.

Two types of light passed through the objective lens of the light reflected from thus formed two light spots is received by the light receiving element through the light receiving lens after the optical axis is rotated by a predetermined angle by a beam splitter.

According to the above constitution, when the moving object moves in the predetermined direction, two kinds of output signals detected by the light receiving element show that one waveform is time delayed from the other waveform. The moving information such as the moving speed or the moved distance of the moving object can be detected by processing the time delay by the processing part.

The optical moving information measuring apparatus according to the present invention may comprise at least one collimator lens and one objective lens. In addition, according to the optical moving information measuring apparatus, two types of light is formed by the two types of light generating means and the two types of light can be processed by the common collimator lens and the objective lens.

Therefore, as compared with the conventional optical moving information measuring apparatus, the number of parts is reduced, the configuration is small and the manufacturing cost can be lowered. In addition, as far as the surface condition (concavo-convex condition) of the moving object is not a mirror surface, even if the moving object has a relatively smooth surface, its moving information can be detected.

DESCRIPTION OF THE PREFERRED EMBODIMENTS

Figure 1:
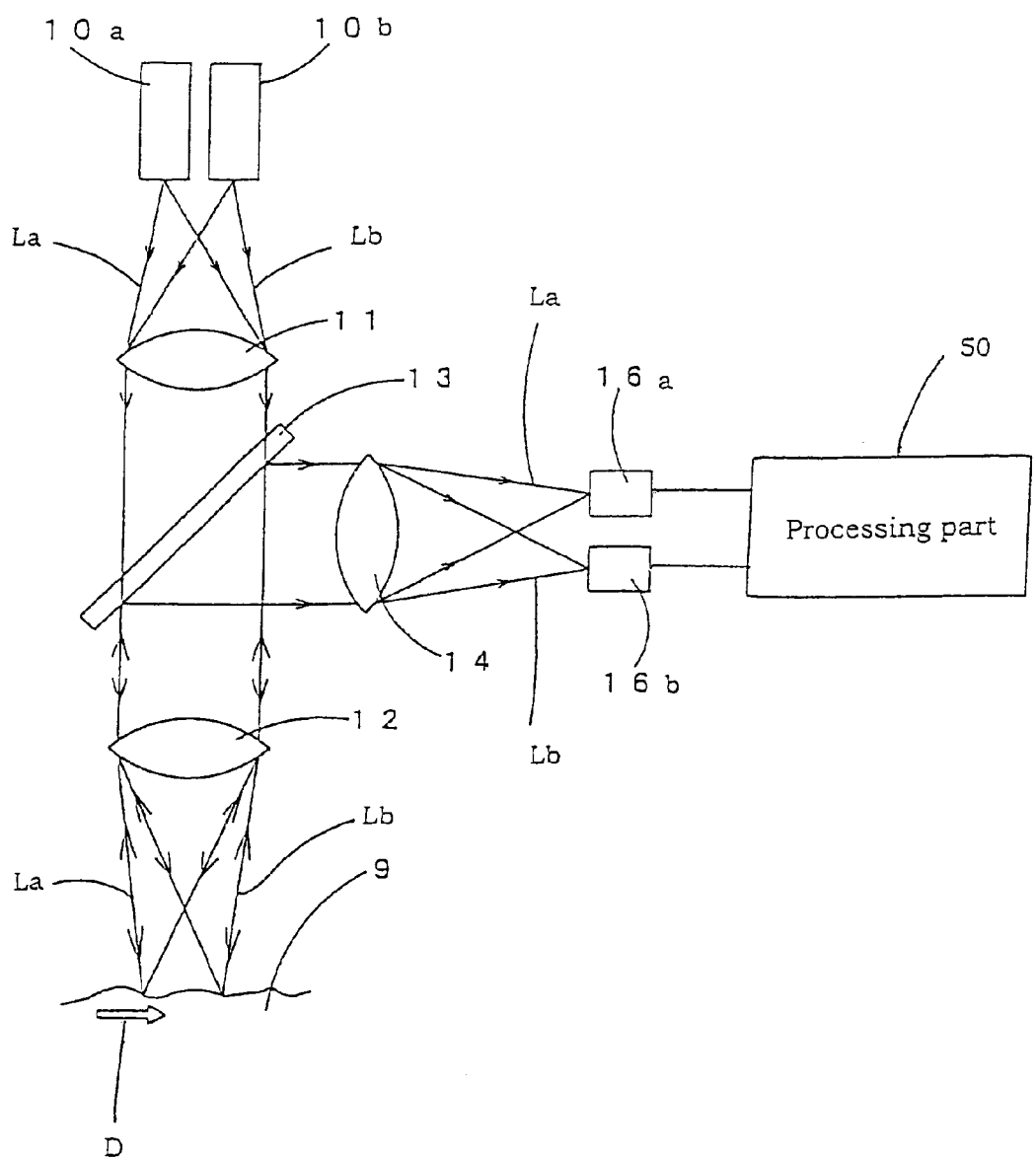
FIG. 1 is a schematic structural view showing an optical moving information measuring apparatus according to an embodiment 1 of the present invention.

According to the optical moving information measuring apparatus of the present invention, the light generating means as the light emitting source may comprise two semiconductor lasers in two packages of light emitting elements arranged in parallel. In this constitution, although it is very simple, the number of parts is reduced, the configuration is small and the manufacturing cost can be lowered, as described above. In addition, as far as the surface condition of the moving object is not a mirror surface, even if the moving object has a relatively smooth surface, its moving information can be detected.

Furthermore, the light generating means as the light emitting source may comprise two chips of semiconductor lasers in one package of light emitting element. In this constitution, the distance between the two light emitting elements is reduced as compared with the case where two semiconductor lasers each has one chip in one package are used. Therefore, a smaller lens can be used and the whole apparatus can be miniaturized and the cost can be lowered. Furthermore, since the distance between two light spots formed on the moving object can be also reduced, even if the moving object is inclined to the predetermined moving direction, the moving information can be detected with high precision.

Furthermore, the light generating means as the light emitting source may comprise one chip of semiconductor laser having two light emitting points in one package of light emitting element. In this constitution, characteristics of the two types of light emitted from the one chip of semiconductor layer having two light emitting points are similar and, although there is a time difference, the two signals detected by the light emitting elements are similar. As a result, the time difference of the two signals can be detected with higher precision, whereby the moving information of the moving object can be also detected with high precision.

In addition, the light generating means as the light emitting source may comprise one light emitting element and one prism such as Wollaston prism or beam displacer, positioned between the collimator lens and the objective lens, for dividing light passed through the collimator lens into two and delivering it to the objective lens. In this constitution, since the characteristics of the two types of light obtained from the prism are almost the same and, although there is a time difference in the two signals detected by the light emitting element, the signals are considerably similar. As a result, the time difference of the two signals can be detected with higher precision, whereby the moving information of the moving object can be also detected with high precision.

Still further, the light generating means as the light emitting source may comprise one light emitting element and one diffraction grating positioned between the light emitting element and the collimator lens for dividing the light emitted from the light emitting element into two and delivering it to the collimator lens. In this constitution, since the characteristics of the two types of light obtained from the diffraction grating are almost the same and, although there is a time difference in the two signals detected by the light emitting element, the signals are considerably similar. As a result, the time difference of the two signals can be detected with higher precision, whereby the moving information of the moving object can be also detected with high precision.

The optical moving information measuring apparatus according to the present invention preferably further comprises a mask having pinholes disposed in front of the light receiving element. If the mask having pinholes is provided and the light is received through the pinholes, disturbance light can be prevented by the mask. In addition, even if the spot light is not narrowed by another means, since the light from the limited region can be received by the pinholes. As a result, even if the distance from the moving object is varied and the size of the light spot on the moving object is varied, the surface condition of the moving object can be read with high precision. Consequently, the time difference of the two signals can be detected with high precision, whereby the moving information of the moving object can be detected with high precision.

In addition, the mask with pinholes is integrally provided on respective two divided light receiving surfaces of one light receiving element such that one pin hole corresponds to one divided light receiving surface. If the mask is thus provided, since the respective pinholes correspond to the respective divided light receiving surfaces of the light receiving element, the size/position of the pinholes can be decided with high precision.

Furthermore, the configuration of the pinhole can be an oval or rectangular which is long in the direction vertical to the moving direction of the moving object. In this constitution, even if the actual moving direction is shifted from the predetermined direction to some extent, since the signal variation becomes small as compared with a case where the configuration of the pinhole is circular, there can be provided the optical moving information measuring apparatus which is tolerant of the shift from the predetermined direction.

Still further, according to the optical moving information measuring apparatus of the present invention, the predetermined distance between the two light spots preferably satisfies A~S·A/tan θ. Wherein A is a size (diameter) of each of the two light spots, S is a ratio of a relative shift length of the two light spots, to A, that is, when the light spot having the size (diameter) A is shifted on the moving object, the shift length to A, which can regard the signal from the light emitting element as the same as the case where there is no region shift and θ is an angle formed by an actual moving direction of the moving object and a predetermined moving direction. In which it satisfies 0.4 >S>tan θ.

According to the optical moving information measuring apparatus which satisfies the above condition, since the distance between the centers of the two light spots is larger than A but smaller than S·A/tan θ, there can be provided the optical moving information measuring apparatus which is tolerant of the shift of the actual moving direction from the predetermined moving direction of the moving object.

According to the optical moving information measuring apparatus of the present invention, the moving information, for example, is moving speed or moved distance of the moving object.

According to the optical moving information measuring apparatus of the present invention, the processing part may be composed that it smoothes light receiving outputs from the light receiving element by a low-pass filter, finds delay time of one light receiving output from the other light receiving output by a correlation calculation about each smoothed light receiving output, and finds moving speed of the moving object by using the delay time.

According to the optical moving information measuring apparatus of the present invention, the processing part may be composed that it averages light receiving outputs from the light receiving element by using other light receiving outputs before and behind, finds delay time of one light receiving output from the other light receiving output by a correlation calculation about each averaged light receiving output, and finds moving speed of the moving object by using the delay time.

According to the optical moving information measuring apparatus of the present invention, the processing part may be composed that it differentiates light receiving outputs from the light receiving element, finds delay time of one light receiving output from the other light receiving output by a correlation calculation about a differentiated signal of each light receiving output, and finds moving speed of the moving object by using the delay time.

According to the optical moving information measuring apparatus of the present invention, the processing part may be composed that it smoothes light receiving outputs from the light receiving element by a low-pass filter, differentiates the smoothed light receiving outputs, finds delay time of one light receiving output from the other light receiving output by a correlation calculation about a differentiated signal of each smoothed light receiving output, and finds moving speed of the moving object by using the delay time.

According to another aspect of the present invention, there is provided a carrier system which incorporates the optical moving information measuring apparatus according to one aspect of the present invention and further comprises a carrying apparatus for carrying the moving object in a certain direction and a carrying operation control part which feeds back the moving information of the moving object detected by the optical moving information measuring apparatus to the carrying apparatus and controls the carrying operation of the carrying apparatus.

According to the carrier system according to another aspect of the present invention, since the moving information of the moving object detected by the optical moving information measuring apparatus is fed back to the carrying apparatus and the carrying operation of the carrying apparatus is controlled by the carrying operation control part, the moving information such as the moving speed of the moving object can be kept constant.

According to still another aspect of the present invention, there is provided a carrier system which incorporates the optical moving information measuring apparatus according to one aspect of the present invention and further comprises a carrying apparatus for carrying the moving object in a certain direction, processing apparatus for processing a predetermined operation to the moving object, and a processing operation control part which feeds back the moving information of the moving object detected by the optical moving information measuring apparatus to the processing apparatus and controls the processing operation of the moving object.

According to the carrier system according to the still another aspect of the present invention, when some sort of operation is performed to the moving object while it is carried, since the moving information such as the moving speed of the moving object detected by the optical moving information measuring apparatus is fed back to the processing device and timing of the processing operation is controlled by the processing operation control part, whereby the processing operation for the moving object can be performed at a predetermined position.

Hereinafter, a description will be made of an optical moving information detection device according to seven embodiments of the present invention in detail with reference to the drawings. The present invention is not limited to these embodiments.

Embodiment 1

As shown in FIG. 1, an optical moving information measuring apparatus according to an embodiment 1 of the present invention comprises two light emitting elements 10a and 10b serving as a light emitting source, a collimator lens 11, an objective lens 12, a beam splitter 13, a light receiving lens 14, and two light receiving elements 16a and 16b.

Two light emitting elements 10a and 10b comprise two packages arranged in parallel and each of them is constituted by a semiconductor laser in this case. The light emitting elements 10a and 10b emit light La and Lb, respectively. The collimator lens 11 collimates the light emitted from the two light emitting elements 10a and 10b. The objective lens 12 converges the collimated light by the collimator lens 11 and irradiates the light La and Lb to a surface of a moving object 9 which is moving in the predetermined direction.

The two semiconductor lasers provide two types of light to be irradiated by the objective lens 12 and function as two types of light emitting means for forming two light spots on the surface of the moving object 9 having a predetermined interval.

The beam splitter 13 rotates an axis of light reflected from the two light spots and converged through the objective lens 12 by a predetermined angle. The light receiving lens 14 receives two types of light from the beam splitter 13 and passes the light. The two light receiving elements 16a and 16b receive the two types of light La and Lb passed through the light receiving lens 14.

Figure 2:
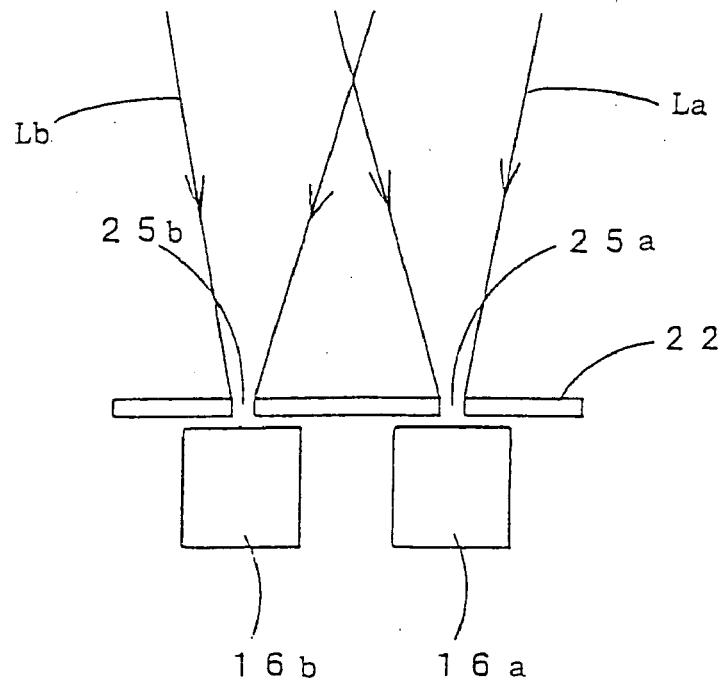
FIG. 2 is an enlarged view showing a light receiving element part in the optical moving information measuring apparatus shown in FIG. 1.

As shown in FIG. 2, the optical moving information detection device further comprises a sheet of mask 22 having pinholes and arranged in front of the light receiving elements 16a and 16b. The mask 22 is formed of an Al mask in a semiconductor process when the light receiving element 16 is manufactured. Two circular pinholes 25a and 25b are provided in the mask 22 so as to correspond to the light receiving surfaces of the light receiving elements 16a and 16b, respectively.

The optical moving information measuring apparatus further comprises a processing part 50. The processing part 50 processes a time delay of one from the other of two output signal waveforms from the two light receiving elements 16a and 16b obtained in accordance with the movement of the moving object 9 on an electric circuit, and detects moving information (for example, moving speed or moved distance) of the moving object 9.

In this optical moving information measuring apparatus, light from the two light emitting element 10 is collimated by the collimator lens 11, the light is irradiated such that the axis of the lens is vertical to the surface of the moving object 9 moving in the predetermined direction and two light spots are formed on the surface of the moving object 9 at a predetermined interval.

The light passed through the objective lens 12 of the light reflected from thus formed two light spots is input to the two light receiving elements 16a and 16b through the light receiving lens 14 after the axis of light is rotated by a predetermined angle by the beam splitter 13.

According to the output signals detected by the two light receiving elements 16a and 16b, one waveform is delayed from the other waveform in time. The time delay is processed by the processing part 50 on the electric circuit to detect the moving information of the moving object.

Figure 3:
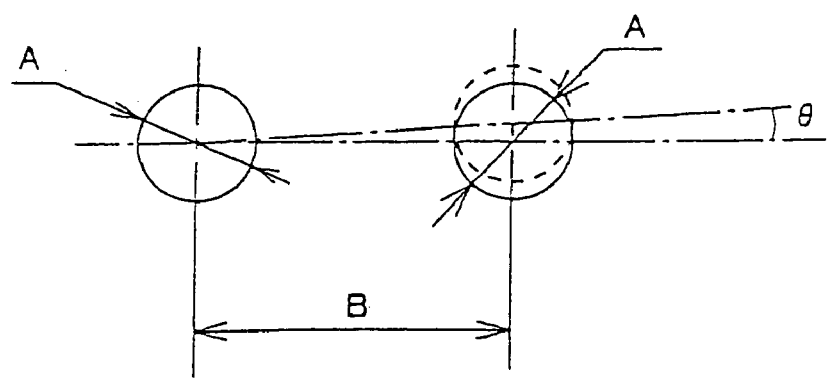
FIG. 3 is a plan view showing two light spots on a moving object in the optical moving information measuring apparatus shown in FIG. 1.

A size (diameter) A of a light spot as shown in FIG. 3 on the moving object 9 is preferably about 10 to 100 $\mu$m in general. If A is smaller than 10 $\mu$m, the light amount input to the light receiving element 16 is small and sufficient output cannot be obtained. Alternatively, if A is larger than 100 $\mu$m, since the light receiving elements 16 receives a signal in which the surface condition of the moving object 9 is averaged, the signal is large in absolute quantity but its S/N ratio is inferior.

The size of each of the pinholes 25a and 25b is decided by the size A (diameter) of the light spot and an optical image formation equation. Here, the optical image formation equation means an equation m=L'/L, wherein L is a distance between the object and the lens, L' is a distance between the lens and an image and m is magnification (size ratio of the image to the object) when the lens forms the image on the opposite side of the moving object.

Furthermore, as shown in FIG. 3, a distance B between the centers of the two light spots satisfies that B=A~S·A/tan $\theta$. Wherein A is the size (diameter) of each light spot, and S is a ratio of a relative shift length of the moving object moving direction in the in-plane perpendicular direction of the two light spots, to A. In other words, S is a ratio of shift length to A, which shift can regard the signal from the light receiving element 16 as the same as the case where there is no region shift when the light spot having the size (diameter) A is shifted on the object as shown by a circle of a broken line in FIG. 3. In addition, $\theta$ is an angle formed by an actual moving direction of the moving object 9 and a predetermined moving direction. And it satisfies 0.4>S>tan $\theta$.

As the distance B between the centers of the two light spots becomes small, the actual moving direction of the moving object 9 is not likely to shift from the predetermine moving direction of the moving object 9 (a signal variation becomes small). However, since either of the two light spots has the size A as shown in FIG. 3, B cannot be less than A.

By the way, according to thus constituted optical moving information measuring apparatus, when the moving object 9 moves in the direction D shown by an arrow, a reflected light amount from a spot of each of the lights La and Lb is varied because of a concavo-convex configuration of the surface of the moving object 9, accordingly a light receiving level of each of the light receiving elements 16a and 16b is varied and respective light receiving outputs are varied. At this time, if the spot of the light La is upstream of the spot of the light Lb in the moving direction of the moving object 9, the light received output variation of the light receiving element 16b is delayed from the light received output variation of the light receiving element 16a by delay time Δt. At this time, if moving speed of the moving object 9 is v, and distance between the centers of the light La and Lb on the moving object 9 is B (already known), since the relation between them becomes v=B/Δt, the moving speed v is found. Furthermore, a moved distance d is obtained by integrating the moving speed v of the moving object 9.

Here, a correlation calculation is used to find the delay time Δt. The correlation calculation means that when a sample row {Xi|i=1, 2, . . . , n} and a sample row {Yi|i=1, 2, . . . , n} are given, a correlation function ρ is found as a statistic for analyzing the similarities of these sample rows. The correlation function ρ is represented by the following equation (1) wherein $\sigma_x$ is standard deviation of the sample row {Xi|i=1, 2, . . . , n}, $\bar{x}$ is an average, and $\sigma_y$ is standard deviation of the sample row {Yi|i=1, 2, . . . , n} and $\bar{y}$ is an average under the condition of $-1 \leq \rho \leq 1$.

$$\rho = \frac{\frac{1}{n}\sum_{i=11}^{n}(xi-\bar{x})(yi-\bar{y})}{\sigma_x \sigma_y} \quad (1)$$

Figure 4:
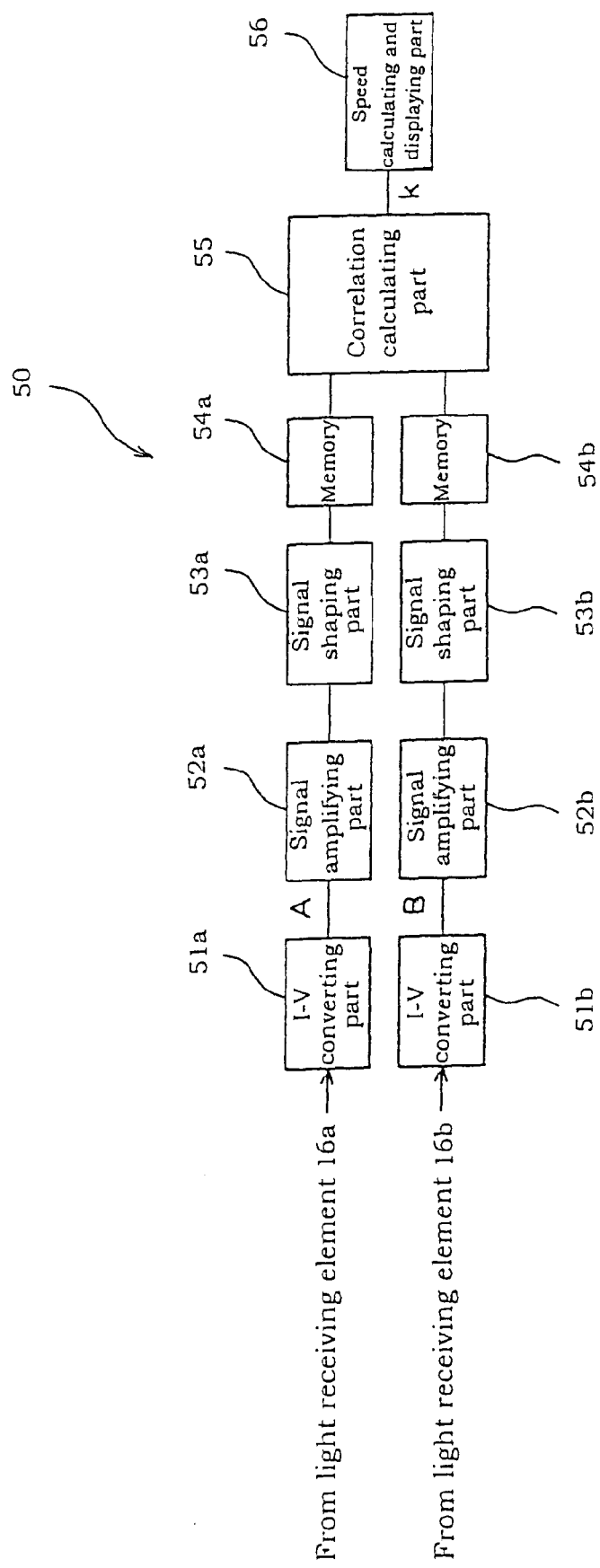
FIG. 4 is a block diagram showing a structure of a processing part in the apparatus shown in FIG. 1.

Such correlation calculation is performed by the processing part 50 and the constitution of the processing part 50 is shown in FIG. 4. The processing part 50 comprises I–V converting parts 51a and 51b which convert current-voltage of the light received outputs of the light receiving elements 16a and 16b and output light received signals A and B, signal amplifying parts 52a and 52b which amplify the light received signals A and B, signal shaping parts 53a and 53b which shapes the waveforms of the amplified light received signals A and B, memories 54a and 54b which sample the shaped light received signals A and B at a constant cycle and store the sampled values of the light received signals A and B as respective sample rows, a correlation calculating part 55 which performs the correlation calculation about the sample rows of the light received signals A and B in the memories 54a and 54b to find delay index k between the light received outputs of the light receiving elements 16a and 16b, and a speed calculating and displaying part 56 which finds moving speed v of the moving object 9 by using the delay index k, finds a moved distance d by integrating the moving speed v and outputs the moving speed v and the moved distance d.

Figure 5:
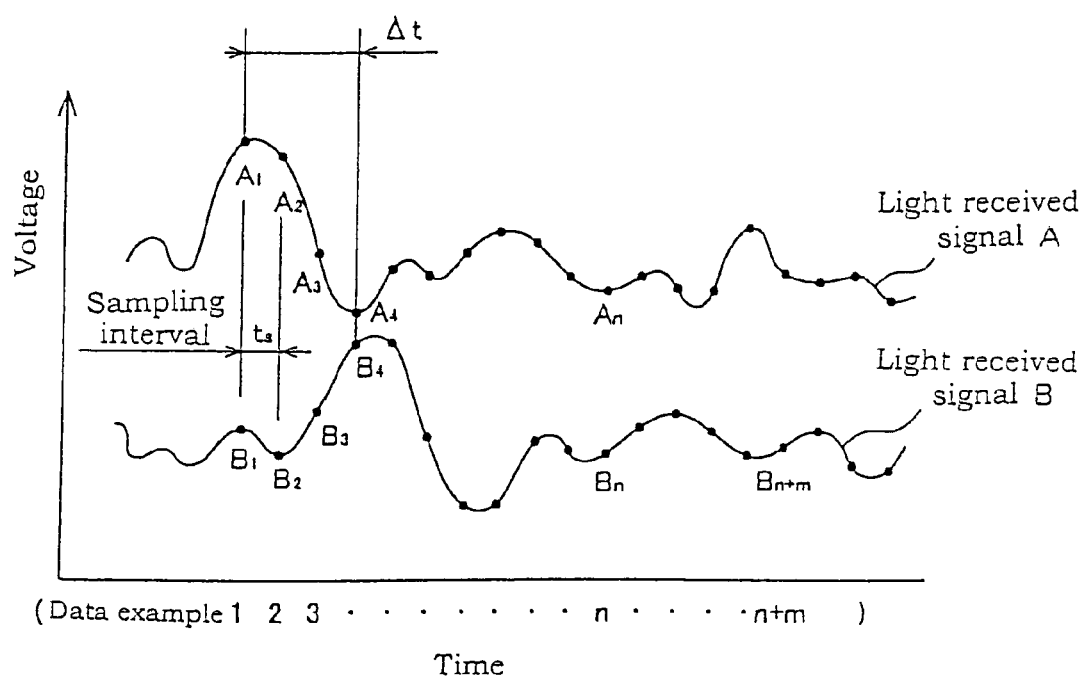
FIG. 5 is a graph showing light received signals in the processing part shown in FIG. 4.

The light received signals A and B output from the I–V converting parts 51a and 51b are shown in a graph in FIG. 5, for example, in which the light received signal B is delayed from the light received signal A by delay time Δt. The light received signals A an B pass through the signal amplifying parts 52a and 52b and the signal shaping parts 53a and 53b and they are sampled at a constant sampling cycle ts and stored by the memories 54a and 54b. Thus, a sample row {A1, A2, . . . , An} and a sample row {B1, B2, . . . , Bn, . . . , Bn+m} are stored in the memories 54a and 54b under the condition of Δt<ts×m.

Figure 6:
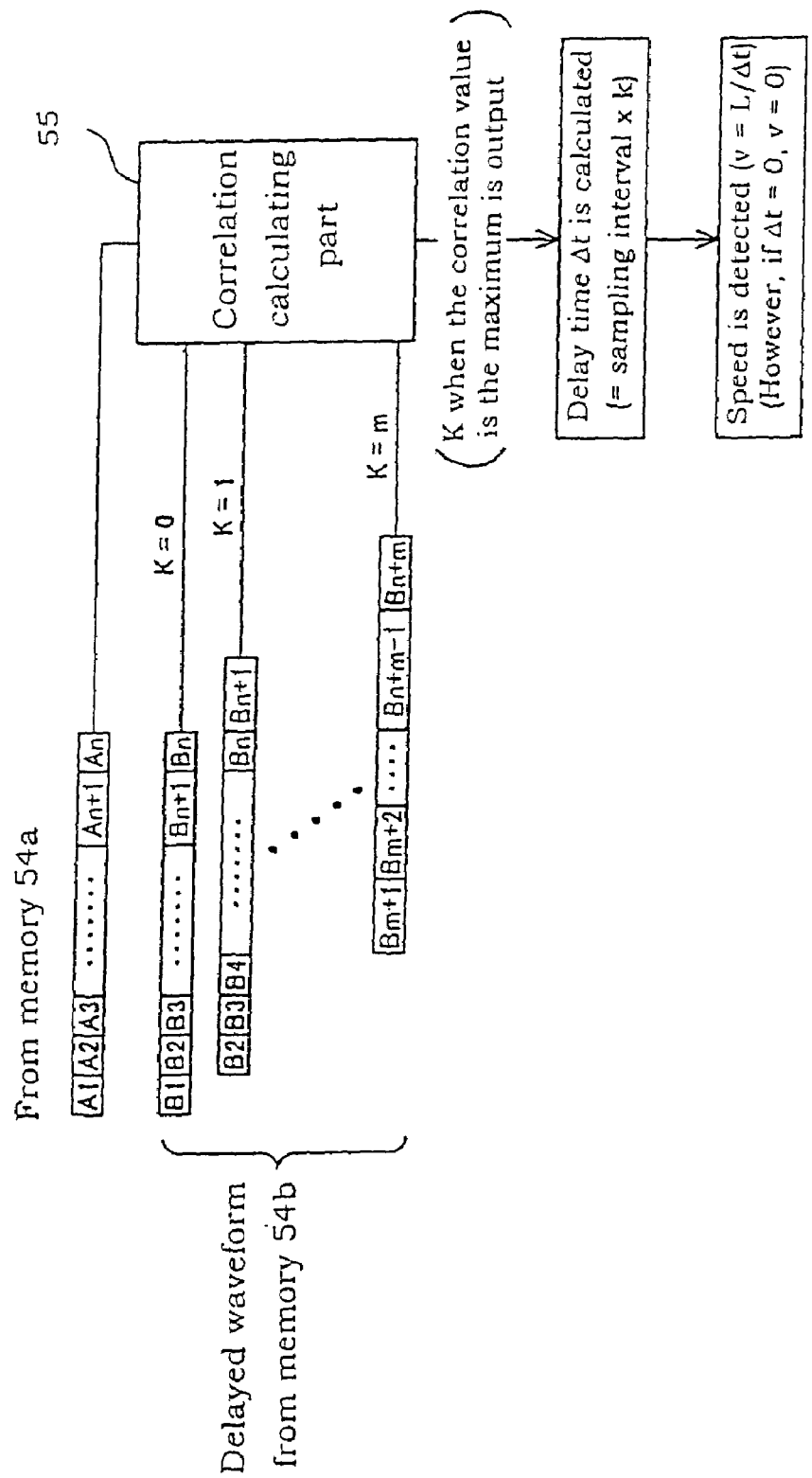
FIG. 6 is a view showing sample rows input to a correlation calculating part in the processing part shown in FIG. 4.
Figure 7:
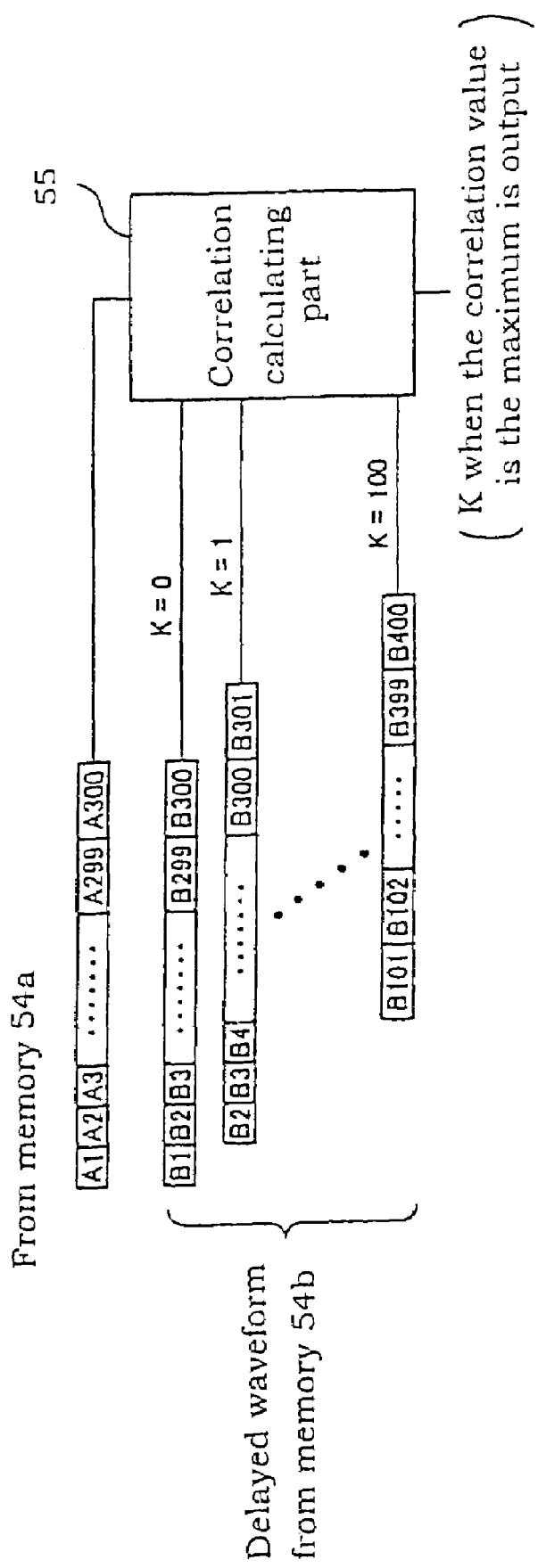
FIG. 7 is a view showing an example of each sample row input to the correlated calculation part in the processing part shown in FIG. 4.

The correlation calculating part 55 sequentially extracts n sampling values from the sample row {B1, B2, . . . , Bn, . . . , Bn+m} as shown in FIG. 6 and successively finds a coefficient of correlation of the sample row {A1, A2, . . . , An} and a sample row {B1, B2, . . . , Bn,}, a coefficient of correlation of the sample row {A1, A2, . . . , An} and a sample row {B2, B3, . . . , Bn, Bn+1}, and a coefficient of correlation of the sample row {A1, A2, . . . , An} and a sample row {B3, B4, . . . , Bn, Bn+1, Bn+2} each time. Similarly, it finds a coefficient of correlation until the sample row {A1, A2, . . . , An} and a sample row {Bm+1, . . . , Bn+m}. For example, if n=300 and m=100 as shown in FIG. 7, a coefficient of correlation of a sample row {A1, A2, . . . , A300} and a sample row {B1, B2, . . . , B300}, a coefficient of correlation of the sample row {A1, A2, . . . , A300} and a sample row {B2, B3, . . . , B301}, . . . , a coefficient of correlation of the sample row {A1, A2, . . . , A300} and a sample row {B101, . . . , B400} are sequentially found.

Then, the shift length (delay time Δt) of the sample row of the light receive signal B from the sample row of the light received signal A when the coefficient of the correlation becomes the maximum is found The shift length is represented by the sampling cycle x k (k: 0, 1, 2, . . . , $0 \leq k \leq m$) and the k is output from the correlation calculating part 35 as the delay index. For example, according to the light received signals A and B shown in FIG. 5, k is equal to 3.

The speed calculating and displaying part 56 multiples the delay index k by the sampling cycle to find the delay time Δt, divides the distance B (already known) between the centers of the spots of the lights La and Lb on the moving object 9 by the delay time Δt to find the moving speed v of the moving object 19 (v=B/Δt ), finds the moved distance d by integrating the moving speed v, and outputs or displays the moving speed v or the moved distance d.

As described above, according to the optical moving information measuring apparatus of this embodiment of the present invention, the delay time Δt between the light received outputs of the light receiving elements 16a and 16b when the moving object 9 is moved is found and the moving speed v and the moved distance d are obtained by using the delay time Δt.

Figure 8:
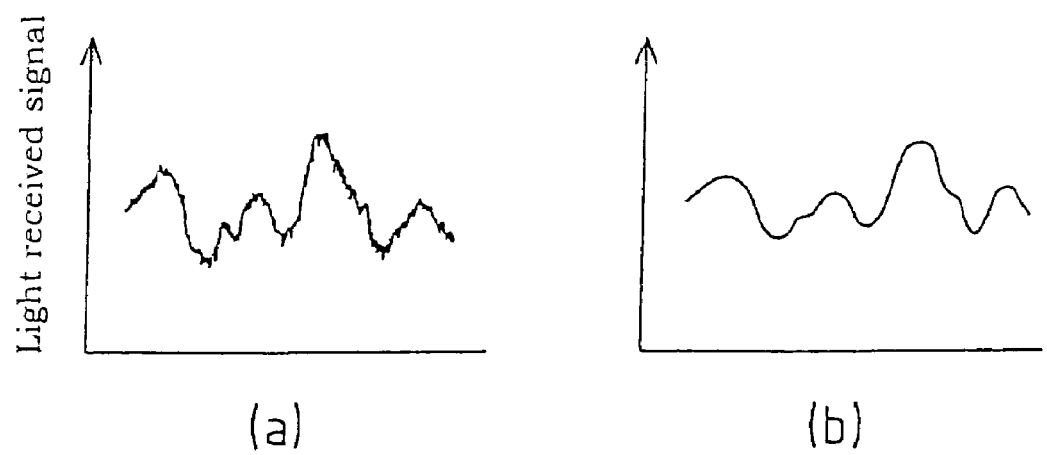
FIG. 8(a) is a graph showing a light received signal containing a noise and FIG. 8(b) is a graph showing a light received signal smoothed by LPF.

By the way, the signal shaping parts 53a and 53b of the processing part is a low-pass filters (LPF), for example. If a minute noise is contained in the light received signal as shown in FIG. 8(a) because of a noise of disturbance light, a signal noise or the like, the minute noise may be reduced by the LPF so that the light received signal is smoothed as shown in FIG. 8(b). As a result, precision of the correlation calculation can be improved.

Figure 9:
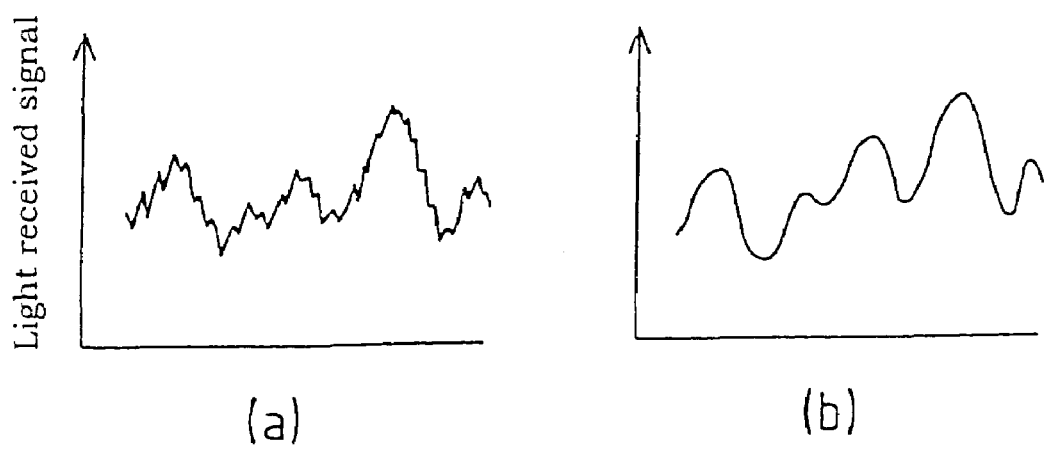
FIG. 9(a) is a graph showing a light received signal containing a noise and FIG. 9(b) is a graph showing an averaged light received signal.

Alternatively, instead of smoothing by the LPF, the level of the light received signal which constantly varies as shown in FIG. 9(a) may be averaged by using the level of the light received signal before and behind so that the light receive signal is generated as shown in FIG. 9(b). For example, the level of the light received signal at time t2 is added to the levels of the light received signals at time t1 and t3 and the sum is divided by 3 to average the level of the light received signal at time t2. Similarly, the levels of the signals at time t3, t4, . . . are averaged. In addition, the number of the light received signals to be averaged may be increased or decreased.

Figure 10:
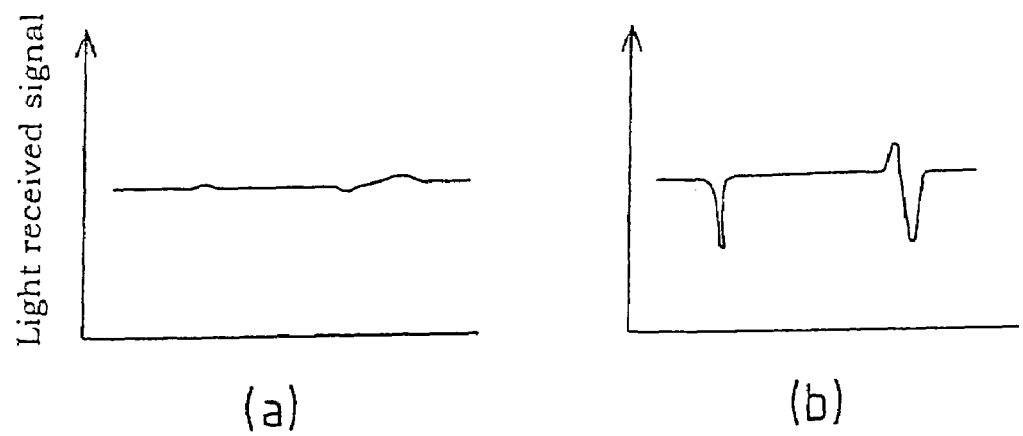
FIG. 10(a) is a graph showing a light received signal having a small variation and FIG. 10(b) is a graph showing a differentiated signal of the light received signal.

Alternatively, the signal shaping parts 53a and 53b may differentiate the light received signals and output this differentiated signals. This differentiating operation is effective when the concavo-convex configuration of the surface of the moving object 9 is small and the variation of the light received signals is small as shown in FIG. 10(a). When the light received signals are differentiated, there can be provided the differentiated signals which largely vary as shown in FIG. 10(b) and the coefficient of correlation of the differentiated signals of the light received signals A and B is also increased. As a result, the delay time between the light received signals A and B can be accurately found so that the moving speed of the object 19 can be precisely obtained.

Figure 11:
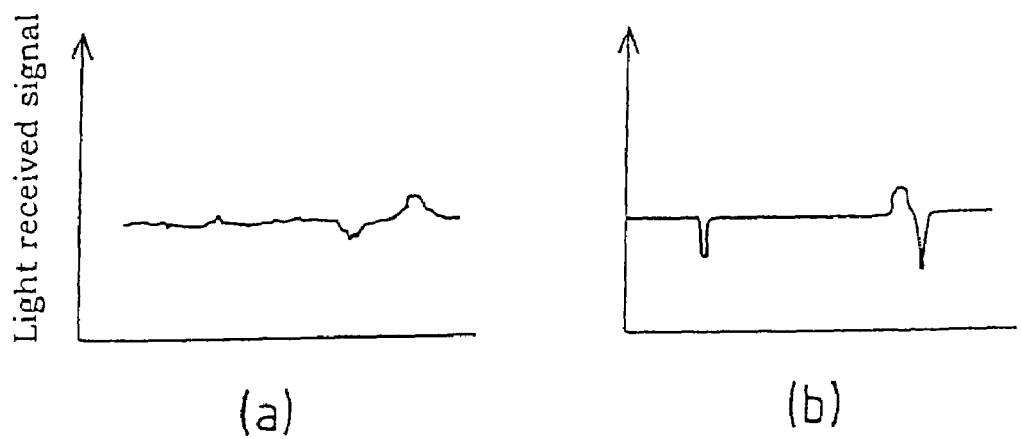
FIG. 11(a) is a graph showing a light received signal containing a noise and having a small variation and FIG. 11(b) is a graph showing a differentiated signal of a smoothed or averaged light received signal.

Furthermore, when the minute noise is contained in the light received signals and the variation of the light received signals is small as shown in FIG. 11 (a), the light received signals may be smoothed by the LPF or averaged and the signals are differentiated before the correlation calculation is performed as shown in FIG. 11(b). As a result, the noise is reduced and the precision of the delay time is improved.

According to the optical moving information measuring apparatus of the embodiment 1 of the present invention, the number of parts is reduced and the configuration is small and manufacturing cost can be low as compared with the conventional optical moving information measuring apparatus.

In addition, when the moving object 9 is moved, the signals detected by the two light receiving element 16a and 16b correspond to the surface condition of the moving object 9 and one signal waveform is time delayed from the other signal waveform. Since the distance B between the light spots (distance between centers) on the moving object 9 is already known, if the time delay is processed on the electric circuit by the processing part 50, the moving speed of the moving object 9 can be detected.

Then, as far as the surface condition (concavo-convex condition) of the moving object 9 is not a mirror surface, even if the moving object 9 has the relatively smooth surface, its moving speed can be detected.

Furthermore, the optical moving information measuring apparatus according to the embodiment 1 of the present invention further comprises a sheet of mask 22 having pinholes in front of the two light receiving elements 16a and 16b. Therefore, if light is received through the pinholes 25a and 25b, disturbance light can be prevented by the mask 22. In addition, even if the spot light is not narrowed by another means, since light from the limited region can be received by the pinholes 25a and 25b, even if the distance from the moving object 9 is varied and the size of the light spot on the moving object 9 is varied, the surface condition of the moving object 9 can be read with high precision. Consequently, the time difference of the two signals can be detected with high precision, whereby the moving information of the moving object 9 can be detected with high precision.

Furthermore, since the mask 22 is formed of an Al mask for example, in the semiconductor process when the light receiving elements 16a and 16b are manufactured, the size/position of the pinholes 25a and 25b can be decided with precision of submicron.

Still further, according to the optical moving information measuring apparatus of the embodiment 1 of the present invention, since the distance B between the centers of the two light spots is larger than A but smaller than S·A/tan θ, there can be provided the optical moving information measuring apparatus which is tolerant of the shift of the actual moving direction of the moving object 9 from the predetermined moving direction.

Embodiment 2

Figure 12:
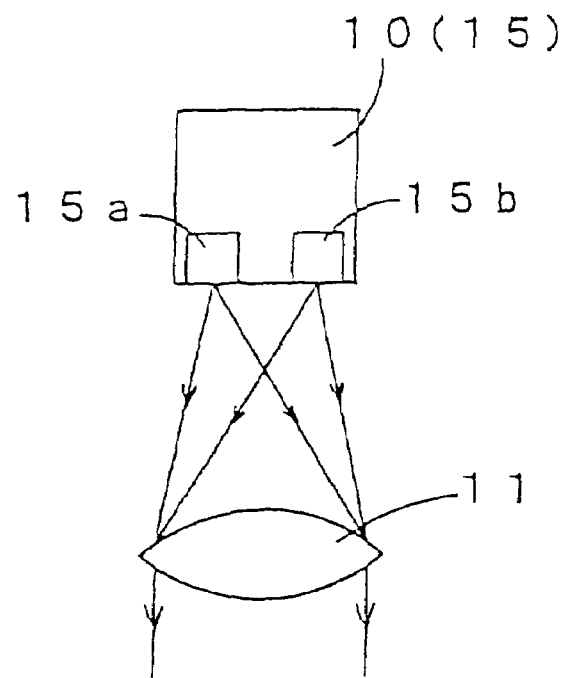
FIG. 12 is an enlarged view showing a light emitting element part of an optical moving information measuring apparatus according to an embodiment 2 of the present invention.
Figure 13:
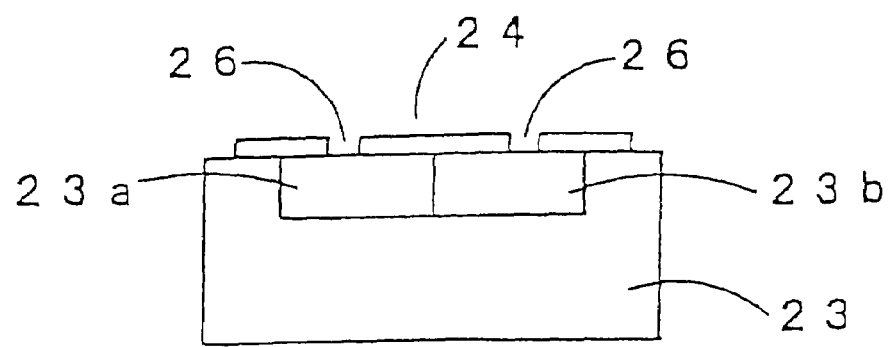
FIG. 13 is an enlarged view showing a light receiving element part of the optical moving information measuring apparatus according to the embodiment 2 of the present invention.

As shown in FIGS. 12 and 13, an optical moving information measuring apparatus according to an embodiment 2 of the present invention is different from the optical moving information measuring apparatus according to the embodiment 1 of the present invention in that a light emitting element 10 as a light emitting source comprises a semiconductor laser 15 including two chips 15a and 15b in one package and two types of light generating means is the semiconductor laser 15. A mask 24 with pinholes is integrally provided on two divided light receiving surfaces 23a and 23b of one light receiving element 23 such that one pinhole 26 corresponds to divided one light receiving surface 23a (23b).

The configuration of the pinhole 26 is an oval which is long in the direction vertical to the moving direction of the moving object 9.

The constitution of other parts of the optical moving information measuring apparatus according to the embodiment 2 is the same as that of the optical moving information measuring apparatus according to the embodiment 1 of the present invention.

According to the optical moving information measuring apparatus of the embodiment 2 of the present invention, since the light emitting element 10 comprises the semiconductor laser 15 including the two chips 15a and 15b in one package and two types of light generating means is the semiconductor layer 15, a distance between the two light emitting portions becomes smaller than the case where two semiconductor lasers each having one chip in one package are used. Accordingly, a smaller lens can be used and the whole of the apparatus can be miniaturized and the cost can be lowered.

Furthermore, since the distance between two light spots formed on the moving object 9 can be also reduced, even if the moving object 9 is inclined to the predetermined moving direction, the moving information can be detected with high precision.

In addition, since the mask 24 with pinholes is integrally provided on the two divided light receiving surfaces 23a and 23b of the light receiving element 23 such that one pinhole 26 corresponds to divided one light receiving surface 23a (23b), the size/position of the pin hole 26 can be decided with high precision and the cost can be lowered.

Other effects of the optical moving information measuring apparatus according to the embodiment 2 are the same as those of the optical moving information measuring apparatus according to the embodiment 1 of the present invention.

Embodiment 3

Figure 14:
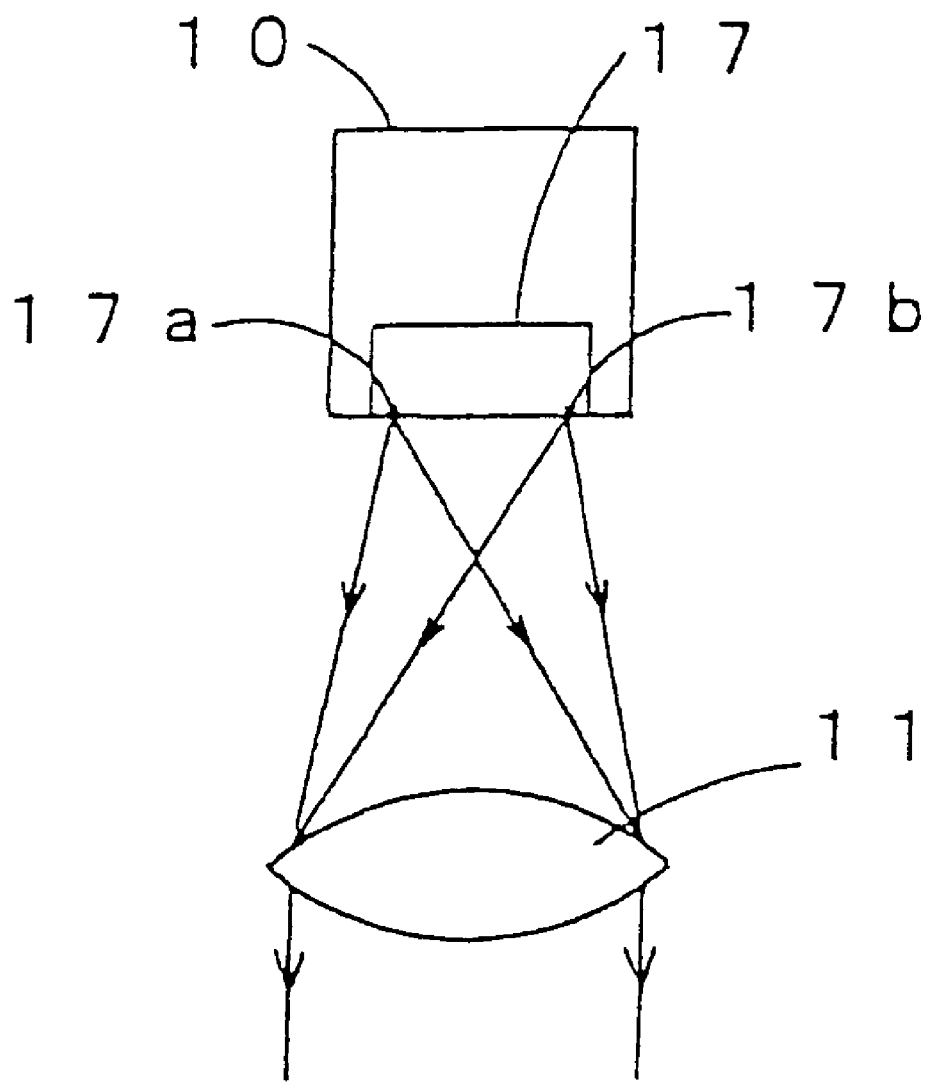
FIG. 14 is an enlarged view showing a light emitting element part of an optical moving information measuring apparatus according to an embodiment 3 of the present invention.

As shown in FIG. 14, an optical moving information measuring apparatus according to an embodiment 3 is different from the optical moving information measuring apparatus according to the embodiment 1 of the present invention in that a light emitting element 10 as a light emitting source comprises a semiconductor layer 17 including one chip having two light emitting points 17a and 17b in one package and the two types of light generating means is the semiconductor laser 17.

The constitution of other parts of the optical moving information measuring apparatus according to the embodiment 3 is the same as that of the optical moving information measuring apparatus according to the embodiment 1 of the present invention.

According to the optical moving information measuring apparatus of the embodiment 3 of the present invention, since the light emitting element 10 comprises the semiconductor laser 17 including one chip having two light emitting points 17a and 17b in one package and the two types of light generating means is the semiconductor laser 17, characteristics of the two types of light emitted from the semiconductor layer 17 are similar and, although there is a time difference, the signals detected by the two light emitting elements 16a and 16b are also similar. As a result, the time difference of the two signals can be detected with higher precision, whereby the moving information of the moving object 9 can be also detected with high precision.

Other effects of the optical moving information measuring apparatus according to the embodiment 3 are the same as those of the optical moving information measuring apparatus according to the embodiment 1 of the present invention.

Embodiment 4

Figure 15:
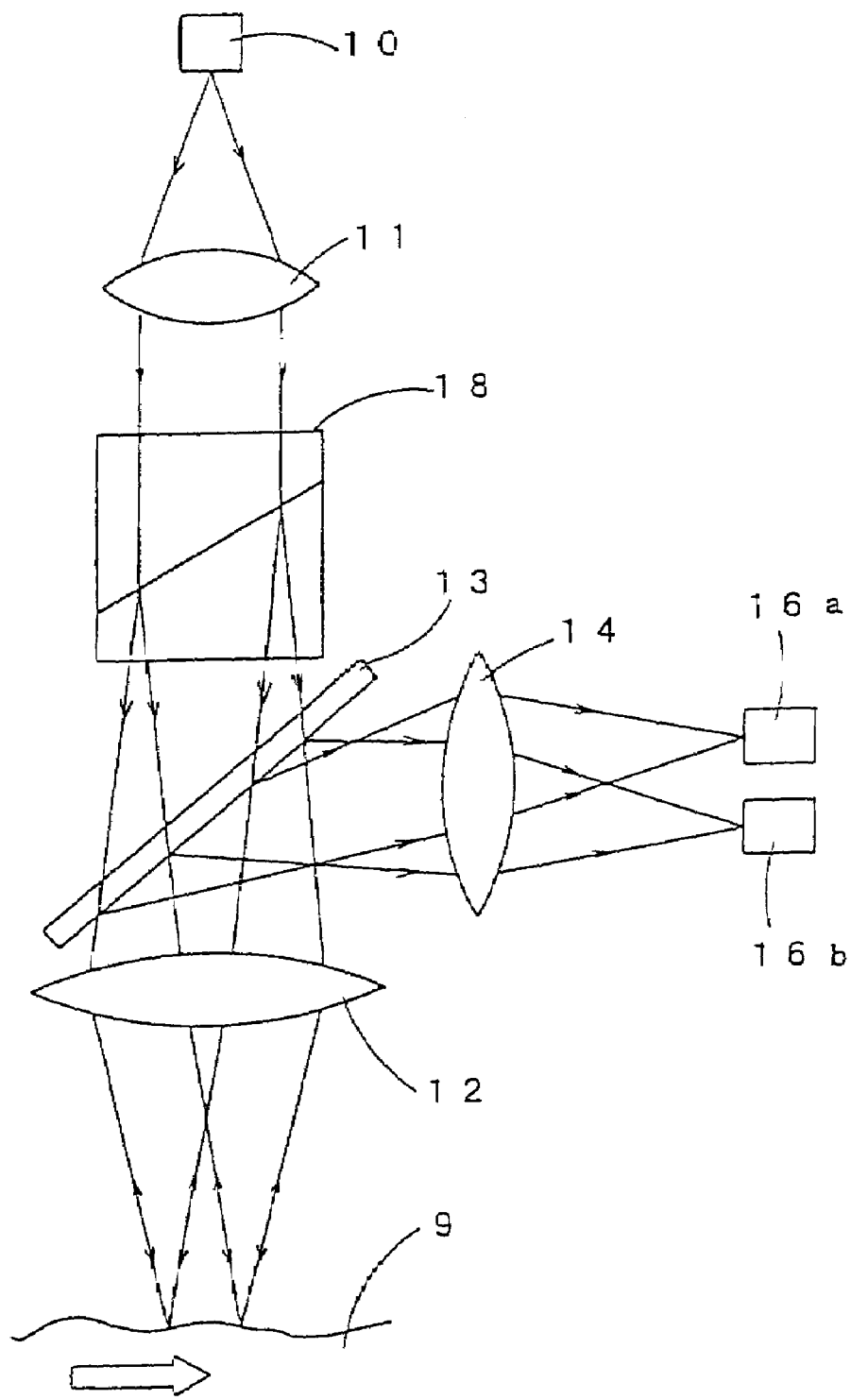
FIG. 15 is a schematic structural view showing an optical moving information measuring apparatus according to an embodiment 4 of the present invention.

As shown in FIG. 15, an optical moving information measuring apparatus according to an embodiment 4 is different from the optical moving information measuring apparatus according to the embodiment 1 of the present invention in that it comprises one light emitting element (comprising semiconductor laser) 10 as one light emitting source and a prism (Wollaston prism or beam displacer) 18 provided as two types of light generating means, for dividing light emitted from the light emitting element 10 and collimated by a collimator lens 11 into two, between the collimator lens 11 and the beam splitter 13.

The constitution of other parts of the optical moving information measuring apparatus according to the embodiment 4 is the same as that of the optical moving information measuring apparatus according to the embodiment 1 of the present invention.

According to the optical moving information measuring apparatus of the embodiment 4 of the present invention, since the characteristics of the two types of light obtained from the prism 18 are almost the same and, although there is a time difference, the signals detected by the two light emitting elements 16a and 16b are considerably similar. As a result, the time difference of the two signals can be detected with higher precision, whereby the moving information of the moving object 9 can be also detected with high precision.

Other effects of the optical moving information measuring apparatus according to the embodiment 4 are the same as those of the optical moving information measuring apparatus according to the embodiment 1 of the present invention.

Embodiment 5

Figure 16:
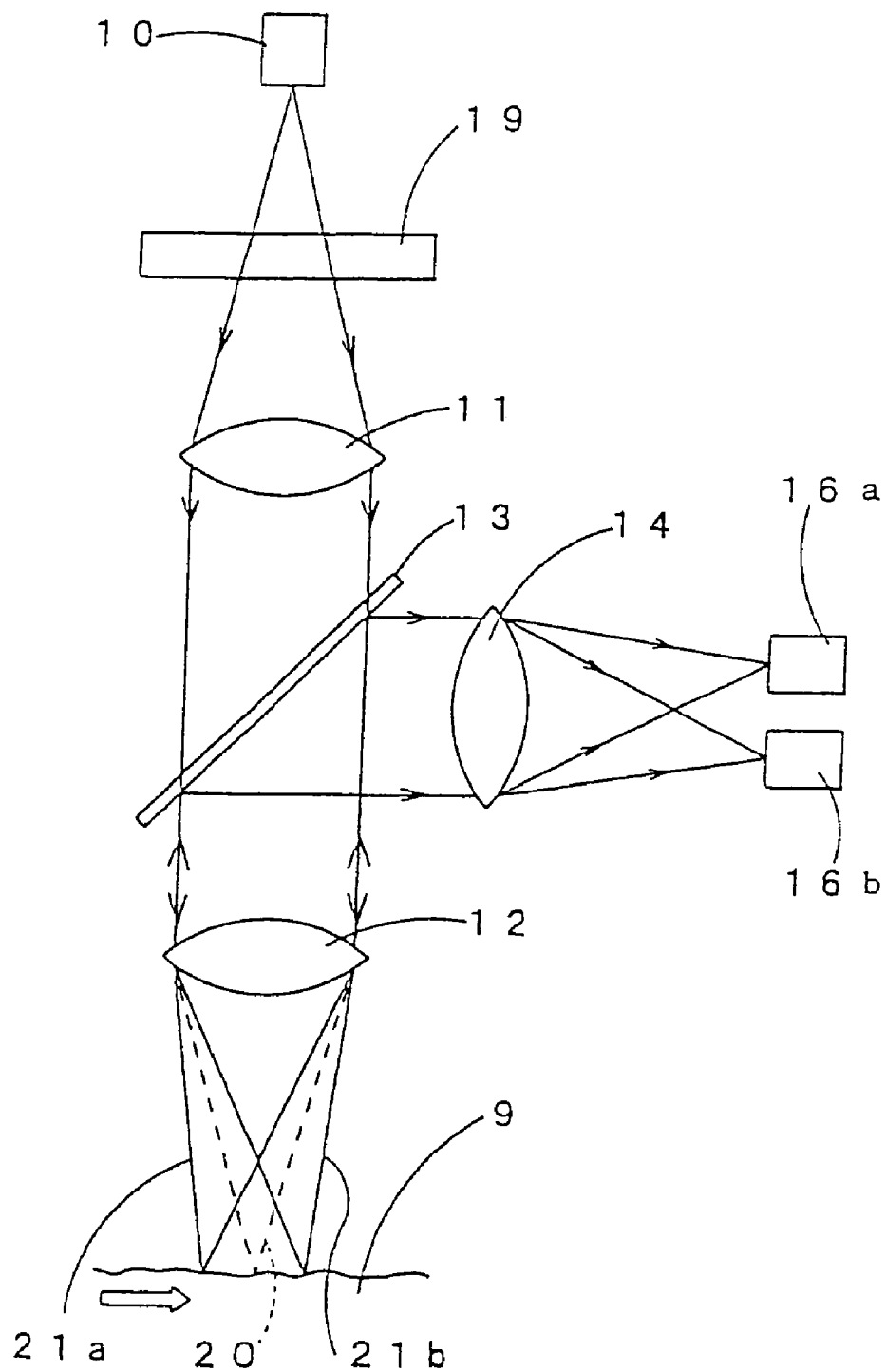
FIG. 16 is a schematic structural view showing an optical moving information measuring apparatus according to an embodiment 5 of the present invention.

As shown in FIG. 16, an optical moving information measuring apparatus according to an embodiment 5 is different from the optical moving information measuring apparatus according to the embodiment 1 of the present invention in that it comprises one light emitting element (comprising semiconductor laser) 10 as a light emitting source and one diffraction grating 19 provided as two types light generating means, for dividing light emitted from the light emitting element 10 into two, between the light emitting element 10 and the collimator lens 11.

In this case, three light spots such as the zero order diffraction 20 and the ±first order diffractions 21a and 21b are formed in a narrow sense. However, if the diffraction grating 19 is appropriately designed, since intensity of the zero order diffraction 20 can be considerably smaller than that of the ±first order diffractions 21a and 21b, the two light spots of the ±first order diffractions 21a and 21b are used in practice.

The constitution of other parts of the optical moving information measuring apparatus according to the embodiment 5 is the same as that of the optical moving information measuring apparatus according to the embodiment 1 of the present invention.

According to the optical moving information measuring apparatus of the embodiment 5 of the present invention, since the characteristics of the two types of light obtained from the diffraction grating 19 are almost the same and, although there is a time difference, the signals detected by the two light emitting elements 16a and 16b are considerably similar. As a result, the time difference of the two signals can be detected with higher precision, whereby the moving information of the moving object 9 can be also detected with high precision.

Other effects of the optical moving information measuring apparatus according to the embodiment 5 are the same as those of the optical moving information measuring apparatus according to the embodiment 1 of the present invention.

Embodiment 6

Figure 17:
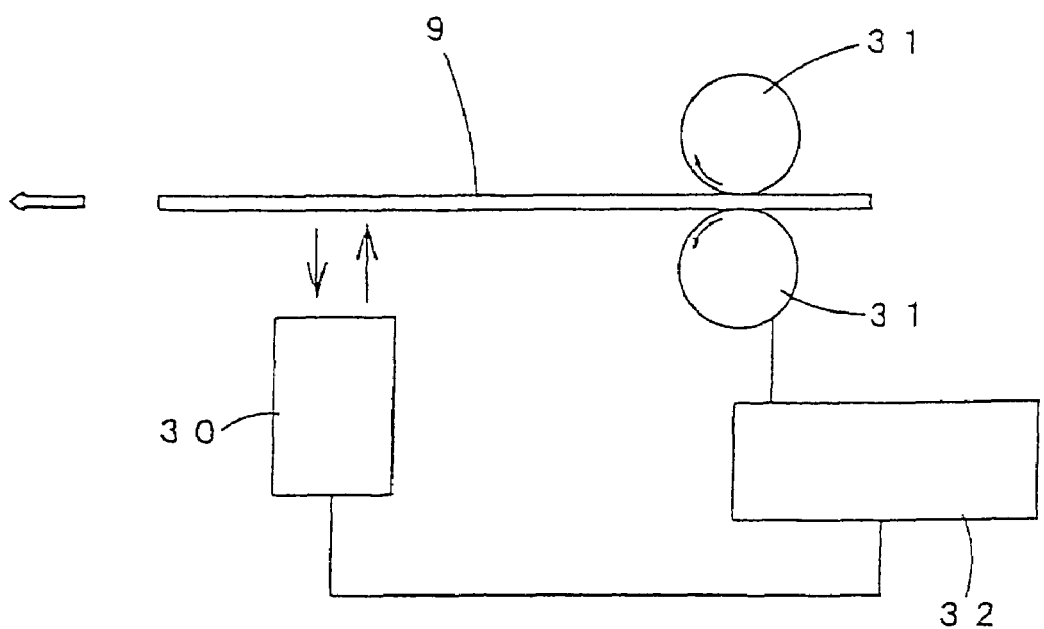
FIG. 17 is a schematic structural view showing a carrier system according to an embodiment 6 of the present invention.

FIG. 17 illustrates a carrier system according to an embodiment 6 in which the optical moving information measuring apparatus 30 according to any one of embodiments 1 to 5 is incorporated.

The carrier system comprises a pair of carrying rollers 31 as a carrying apparatus for carrying the moving object 9 in the left direction, and carrying operation control part 32 for feeding back the moving information of the moving object 6 detected by the optical moving information measuring apparatus 30 to the carrying rollers 31 and controlling the carrying operation of the carrying roller 31.

According to the carrying system of the embodiment 6, since the moving information of the moving object 9 detected by the optical moving information measuring apparatus 30 is fed back to the carrying rollers 31 and the carrying rollers 31 are controlled by the carrying operation control part 32, the moving information such as the moving speed of the moving object 9 can be kept constant.

Embodiment 7

Figure 18:
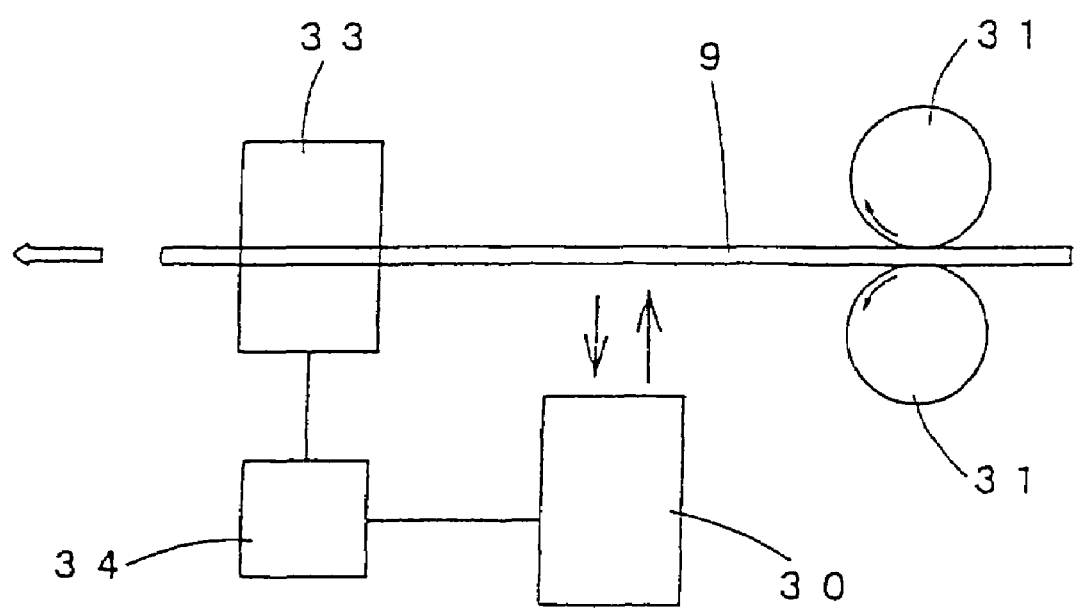
FIG. 18 is a schematic structural view showing a carrier system according to an embodiment 7 of the present invention.
Figure 19:
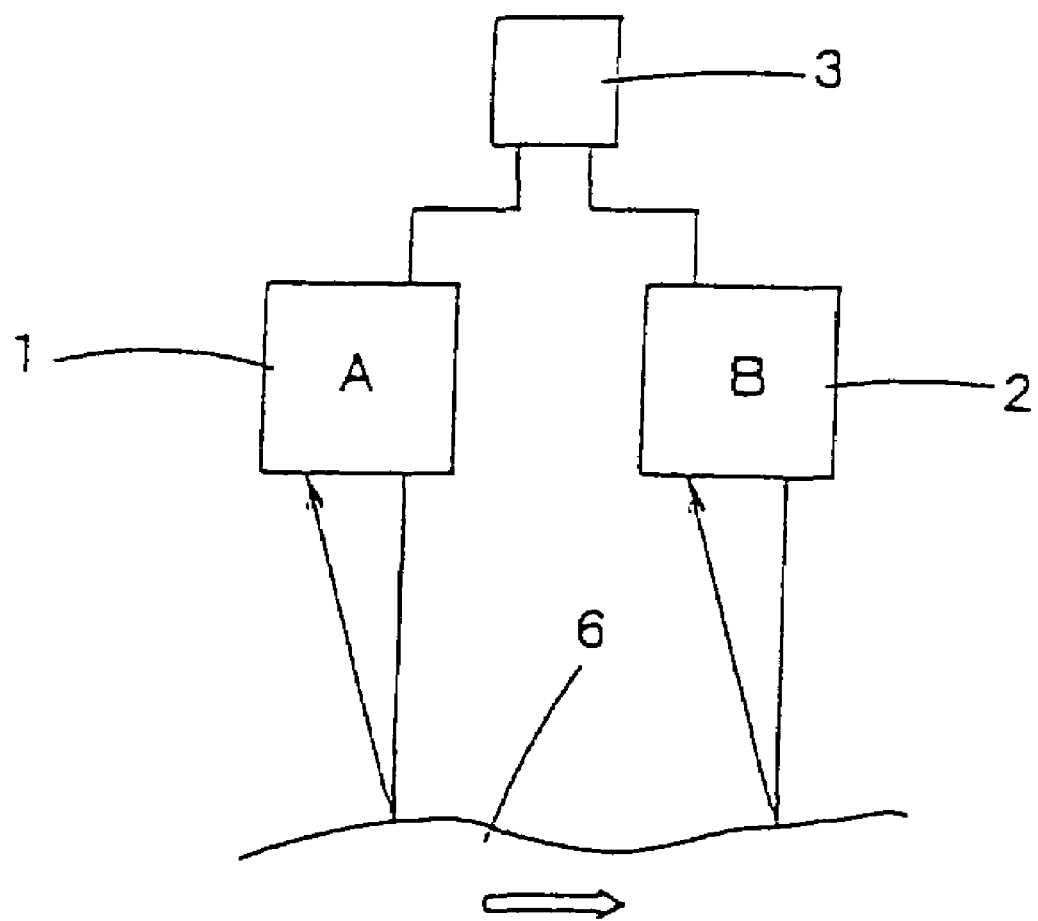
FIG. 19 is a schematic structural view showing a conventional optical moving information measuring apparatus.
Figure 20:
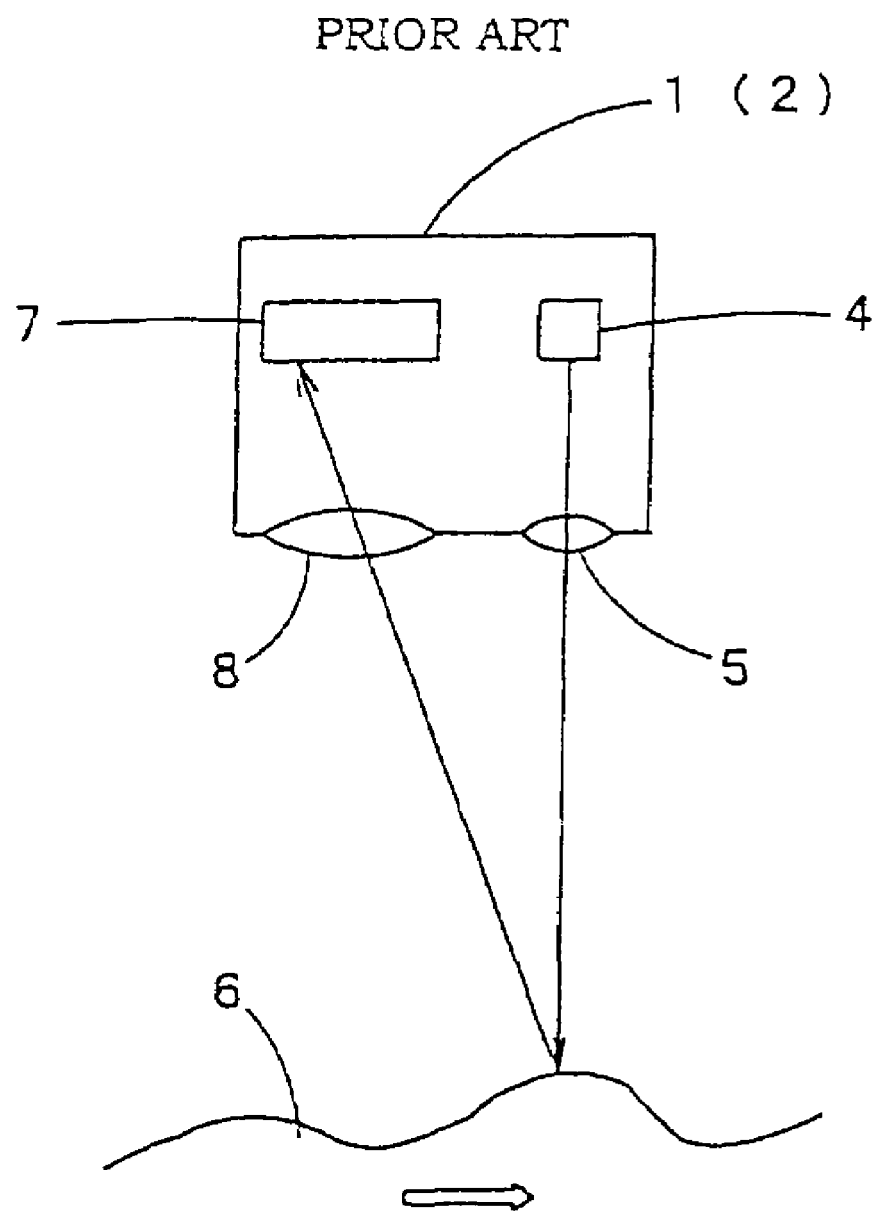
FIG. 20 is an enlarged view showing a distance measuring sensor of the optical moving information measuring apparatus shown in FIG. 19.
Figure 21:
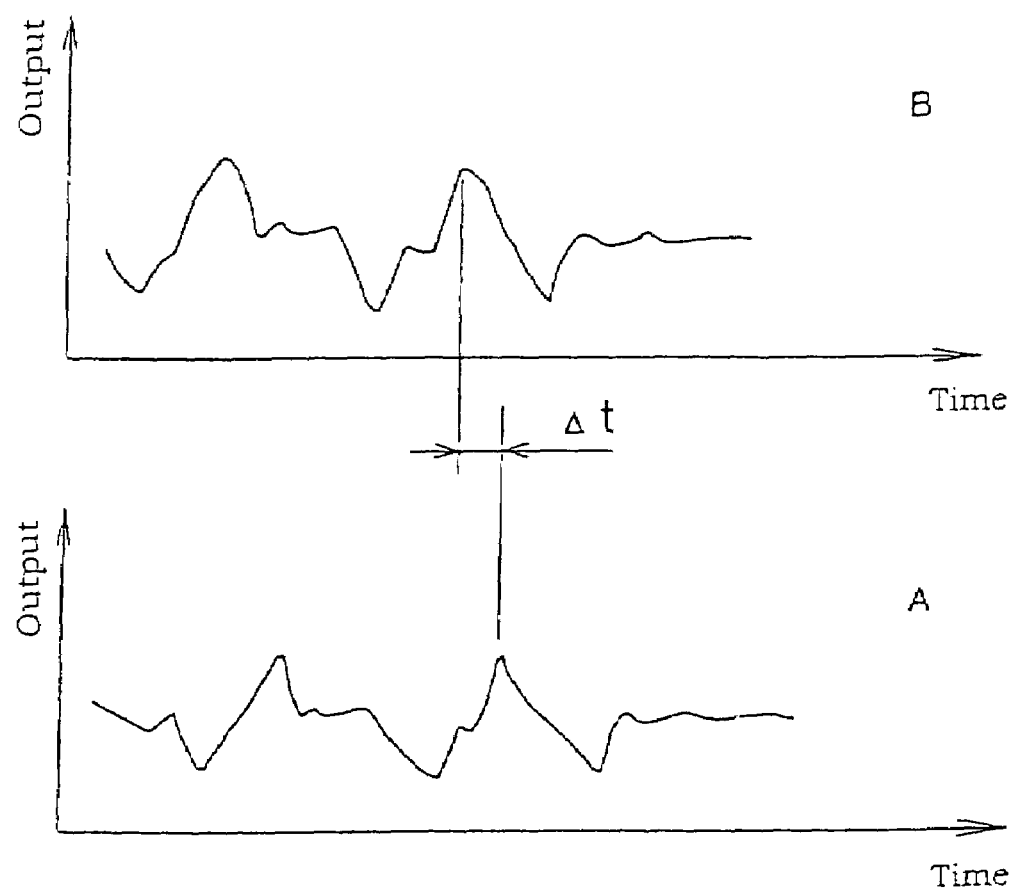
FIG. 21 is a view showing output signal waveforms obtained by the optical moving information measuring apparatus shown in FIG. 19.

FIG. 18 illustrates a carrier system according to an embodiment 7 in which the optical moving information measuring apparatus 30 according to any one of embodiments 1 to 5 is incorporated.

The carrier system comprises a pair of carrying rollers 31 as a carrying apparatus for carrying the moving object 9 in the left direction, a processing apparatus 33 for performing a predetermined operation for the moving object 9 while carried and a processing operation control part 34 for feeding back the moving information of the moving object 9 detected by the optical moving information measuring apparatus 30 to the processing apparatus 33 and controlling the processing operation of the moving object 9.

According to the carrying system of the embodiment 7, since the moving information such as the moving speed of the moving object 9 detected by the optical moving information measuring apparatus 30 is fed back to the processing device 33 and timing of the processing operation is controlled by the processing operation control part 34, whereby the processing operation for the moving object 9 can be performed at a predetermined position.

What is claimed is:

1. An optical moving information measuring apparatus comprising:
light generating means for forming two light spots at a predetermined interval, on a surface of a moving object to be measured, providing at least a light emitting source, a collimator lens for collimating light emitted from the light emitting source and an objective lens for irradiating the light passed through the collimator lens to the surface of the moving object;

a beam splitter for rotating an optical axis of each of two types of light reflected from the light spots and passed through the objective lens by a predetermined angle;

a light receiving lens through which the two types of light from the beam splitter pass;

a light receiving element for receiving the two types of light passed through the light receiving lens; and a processing part for calculating a time delay of one from the other of two types of output signals from the light receiving element obtained by movement of the moving object in order to obtain moving information of the moving object.

2. The optical moving information measuring apparatus according to claim 1, wherein the light generating means comprises two semiconductor lasers in two packages of light emitting elements arranged in parallel as the light emitting source.

3. The optical moving information measuring apparatus according to claim 1, wherein the light generating means comprises two chips of semiconductor lasers in one package of light emitting element as the light emitting source.

4. The optical moving information measuring apparatus according to claim 1, wherein the light generating means comprises one chip of semiconductor laser having two light emitting points in one package of light emitting element as the light emitting source.

5. The optical moving information measuring apparatus according to claim 1, wherein the light generating means comprises one light emitting element as the light emitting source and one prism positioned between the collimator lens and the objective lens, for dividing the light which passed through the collimator lens into two and delivering it to the objective lens.

6. The optical moving information measuring apparatus according to claim 1, wherein the light generating means comprises one light emitting element as the light emitting source and one diffraction grating positioned between the light emitting element and the collimator lens, for dividing the light emitted from the light emitting element into two and delivering it to the collimator lens.

7. The optical moving information measuring apparatus according to claim 1, further comprising a mask having pinholes provided in front of the light emitting element.

8. The optical moving information measuring apparatus according to claim 7, wherein the mask having pinholes is integrally provided on respective two divided light receiving surfaces of one light emitting element and one pin hole corresponds to one divided light receiving surface.

9. The optical moving information measuring apparatus according to claim 7, wherein a configuration of the pinhole of the mask is an oval or a rectangular which is long in the vertical direction to the moving direction of the moving object.

10. The optical moving information measuring apparatus according to claim 1, wherein the predetermined interval for the two light spots is $A \sim S \cdot A / \tan \theta$, wherein A is a size (diameter) of each of the two light spots, S is a ratio of a relative shift length of the two light spots, to A, and $\theta$ is an angle formed by an actual moving direction of the moving object and a predetermined moving direction, providing that it satisfies $0.4 > S > \tan \theta$.

11. The optical moving information measuring apparatus according to claim 1, wherein the moving information is moving speed of the moving object.

12. The optical moving information measuring apparatus according to claim 1, wherein the moving information is moved distance of the moving object.

13. The optical moving information measuring apparatus according to claim 1, wherein the processing part smoothes light receiving outputs from the light receiving element by a low-pass filter, finds delay time of one light receiving output from the other light receiving output by a correlation calculation about each smoothed light receiving output, and finds moving speed of the moving object by using the delay time.

14. The optical moving information measuring apparatus according to claim 1, wherein the processing part averages light receiving outputs from the light receiving element by using other light receiving outputs before and behind, finds delay time of one light receiving output from the other light receiving output by a correlation calculation about each averaged light receiving output, and finds moving speed of the moving object by using the delay time.

15. The optical moving information measuring apparatus according to claim 1, wherein the processing part differentiates light receiving outputs from the light receiving element, finds delay time of one light receiving output from the other light receiving output by a correlation calculation about a differentiated signal of each light receiving output, and finds moving speed of the moving object by using the delay time.

16. The optical moving information measuring apparatus according to claim 1, wherein the processing part smoothes light receiving outputs from the light receiving element by a low-pass filter, differentiates the smoothed light receiving outputs, finds delay time of one light receiving output from the other light receiving output by a correlation calculation about a differentiated signal of each smoothed light receiving output, and finds moving speed of the moving object by using the delay time.

17. A carrier system incorporating the optical moving information measuring apparatus according to claim 1, further comprising a carrying apparatus for carrying the moving object in a certain direction and a carrying operation control part which feeds back the moving information of the moving object detected by the optical moving information measuring apparatus to the carrying apparatus and controls the carrying operation of the carrying apparatus.

18. A carrier processing system incorporating in the optical moving information measuring apparatus according to claim 1, further comprising a carrying apparatus for carrying the moving object in a certain direction, a processing apparatus for performing a predetermined processing to the moving object while carried, and a processing operation control part which feeds back the moving information of the moving object detected by the optical moving information measuring apparatus to the processing apparatus and controls the processing operation of the moving object.

* * * * *